UNITED STATES PATENT OFFICE

WILLIAM HAINSWORTH, OF ALLEGHENY CITY, ASSIGNOR OF ONE-HALF INTEREST TO SEARS M. LOVERIDGE, OF PITTSBURG, PENNSYLVANIA.

IMPROVEMENT IN MOLDS.

Specification forming part of Letters Patent No. 109,894, dated December 6, 1870; reissue No. 4,347, dated April 18, 1871.

*To all whom it may concern:*

Be it known that WILLIAM HAINSWORTH, of Allegheny City, in the county of Allegheny and State of Pennsylvania, has invented a new and useful Improvement in Molds and Cores for Metallic Castings; and we do hereby declare the following to be a full, clear, and exact description thereof.

For reasons well known to those skilled in the art, the making of fine castings, particularly of steel, in ordinary sand-molds is attended with serious difficulty, to overcome which (the melting of the silex of the sand among others) flour, charcoal, and other articles have been mixed with the sand; also a thin wash made up of various ingredients has been applied to the inner face of the mold; but this has proved insufficient to prevent the "fluxing" of the silex.

This invention relates to an improvement in the manufacture of molds and cores, more particularly designed for the making of such castings, wherein pulverized coke treated with sour beer or fire-clay water, or other similar and suitable fluid, is substituted for sand in the body of the mold.

To enable others skilled in the art to make and use the said invention, we will proceed to describe the same.

The coke, being first finely pulverized, is mixed or wet up to about the consistency of putty by the use of sour beer or fire-clay water or other similar and suitable fluid, the object being in the use of such fluid to increase or add to the adhesive properties of the coke, so that the mass, when mixed up, shall possess the proper tenacity. The fire-clay water should be as free as possible of all solid silicious matter.

After the mass is well stirred and worked the mold or core, as the case may be, is made in the same manner as from sand.

The thickness of the mold thus made (measuring from the casting-face outward) need not necessarily be great, the important requisites being strength and imperviousness to the destructive action of the molten metal.

When steel is to be cast the molds or cores should be baked in an oven at about the same temperature and for about the same length of time as dry sand-molds or cores are baked.

For iron castings the dampened coke-molds or cores need no baking, and are at once ready for use.

Pulverized coke treated as above described will answer for all kinds of castings without the admixture of other ingredients, though flour, charcoal, or other suitable material may be added to the coke without detriment.

The advantages to be derived from this invention are that castings made in molds or around cores constructed of pulverized coke treated as herein specified are solid, free from pores, perfectly smooth, true to the pattern, and ready for immediate use.

Having thus described the invention, what is claimed as new, and desired to be secured by Letters Patent, is—

1. Pulverized coke treated with sour beer or fire-clay water or other similar fluid as a material for molds or cores for casting metals, as specified.

2. Molds or cores made of pulverized coke mixed up with a suitable fluid possessing adhesive properties, substantially as specified.

In witness whereof we, the said WILLIAM HAINSWORTH and SEARS M. LOVERIDGE, have hereunto set our hands.

WILLIAM HAINSWORTH.
SEARS M. LOVERIDGE.

Witnesses:
A. S. NICHOLSON,
THOS. B. KERR.